(12) United States Patent
Primrose et al.

(10) Patent No.: US 7,397,875 B2
(45) Date of Patent: Jul. 8, 2008

(54) METHOD OF SYNCHRONISING DATA

(75) Inventors: Kenneth Primrose, Widnes (GB); Carl Hudson, Great Sankey (GB); Allen Parkinson, Broughton (GB)

(73) Assignee: Ericsson AB, Stockholm (SE)

( * ) Notice: Subject to any disclaimer, the term of this patent is extended or adjusted under 35 U.S.C. 154(b) by 662 days.

(21) Appl. No.: 10/380,082

(22) PCT Filed: Sep. 12, 2001

(86) PCT No.: PCT/GB01/04075

§ 371 (c)(1),
(2), (4) Date: Sep. 23, 2003

(87) PCT Pub. No.: WO02/23775

PCT Pub. Date: Mar. 21, 2002

(65) Prior Publication Data

US 2004/0062279 A1    Apr. 1, 2004

(30) Foreign Application Priority Data

Sep. 13, 2000    (GB) .................................. 0022608.4

(51) Int. Cl.
*H04L 7/00* (2006.01)
(52) U.S. Cl. ...................... 375/354; 375/355; 375/356; 375/357; 370/509
(58) Field of Classification Search ................. 375/354, 375/367, 366, 368, 355, 358, 356, 359, 222, 375/220; 370/509, 503, 512, 316; 380/261
See application file for complete search history.

(56) References Cited

U.S. PATENT DOCUMENTS 4,365,329 A    12/1982   Sauvanet
4,390,986 A *  6/1983   Moses ......................... 370/436
4,397,020 A *  8/1983   Howson ....................... 370/510

(Continued)

FOREIGN PATENT DOCUMENTS

EP    0 923 208 A2    6/1999

(Continued)

OTHER PUBLICATIONS

*Demonstration of Optically Interconnected Asynchronous Transfer Mode Switching Fabric*, 1993 IEEE, J. Nishikido, et al., NTT Communications Switching Laboratories, pp. 1187-1191.

Primary Examiner—Chieh M. Fan
Assistant Examiner—Qutub Ghulamali
(74) *Attorney, Agent, or Firm*—Kirschstein et al.

(57) ABSTRACT

A method of synchronizing data in a communications system includes generating a composite signal comprising a serial stream of data partitioned in one or more frames, and transmitting the composite signal to a receiver. Multiphase clock signals are generated. The composite signal received at the receiver is compared with each of the multiphase clock signals until either sustained coincidence therebetween is achieved or sustained non-coincidence is achieved, thereby synchronizing the receiver to bit boundaries in the composite signal and to one or more of the clock phase signals. One or more bit templates at the receiver is correlated with one or more corresponding bit templates in the composite signal received at the receiver to determine where frames start in the composite signal, thereby synchronizing the receiver to the one or more frames in the composite signal.

10 Claims, 9 Drawing Sheets

U.S. PATENT DOCUMENTS

| | | | |
|---|---|---|---|
| 4,518,961 A | | 5/1985 | Davis et al. |
| 4,596,981 A | * | 6/1986 | Ueno et al. ............... 340/825.2 |
| 4,598,413 A | * | 7/1986 | Szechenyi ................... 375/368 |
| 4,672,639 A | | 6/1987 | Tanabe et al. |
| 5,699,389 A | | 12/1997 | Beladi et al. |
| 5,732,113 A | * | 3/1998 | Schmidl et al. ............. 375/355 |
| 5,923,653 A | * | 7/1999 | Denton ....................... 370/375 |
| 6,307,891 B1 | * | 10/2001 | Hein et al. .................. 375/285 |
| 6,359,983 B1 | * | 3/2002 | Krone et al. ........... 379/399.01 |
| 2002/0031146 A1 | * | 3/2002 | Abbas et al. ................ 370/476 |

FOREIGN PATENT DOCUMENTS

| | | | |
|---|---|---|---|
| EP | 0923208 | * | 6/1999 |

* cited by examiner

METHOD OF SYNCHRONISING DATA

BACKGROUND OF THE INVENTION

The present invention concerns a method of synchronising data; in particular, but not exclusively, the invention relates to a method of synchronising received serial data in a communication system. Moreover, the invention also relates to a system operable to synchronise data according to the method.

Methods of synchronising serial data are well known. These methods generally involve steps of:
(i) receiving a serial data stream;
(ii) identifying one or more time distinguishing features in the stream;
(iii) comparing timing of the one or more time features with reference clock timing features; and
(iv) then frequency and phase shifting at least one of the serial data stream and the reference clock so that the stream time distinguishing features and the clock timing features are in a mutually constant phase relationship.

Data synchronisation is especially important in communication systems employing time division multiplexing (TDM) techniques for conveying several input signals in a single composite signal; in TDM, the composite signal comprises repetitive frames, each frame partitioned in sequential time slots. Each input signal has associated therewith a corresponding time slot in the frames in which the signal is conveyed.

In a typical conventional TDM communication system, synchronous transfer of a serial data signal from one piece of system equipment to another often requires a common data clock signal to be available within the system. The data clock signal needs to have a time distinguishing feature to provide a synchronisation reference; for example, the data clock signal can comprise repetitive frame synchronisation pulses together with a regular clock signal. For such a system to function correctly, total serial data signal propagation delays within the system must be significantly less than a data bit period of data in the serial data signal, otherwise it is impossible to identify the start of frames within the serial data signal. Thus, in the typical conventional system having a given system synchronisation architecture, an increase in serial data rate will require a corresponding increase in data clock rate in the architecture. Such an increase in data clock rate is often not practicable in conventional communication systems whose synchronisation architecture is already established. The total serial data propagation delays, and corresponding propagation delays to clock data within the system, are a limiting factor governing physical separations of data transmitters and data receivers within the system; the inventors have appreciated that this limiting factor is a problem.

SUMMARY OF THE INVENTION

The present invention has arisen in an endeavour to provide a method of synchronising data which is at least in part more tolerant to serial data propagation delays.

According to a first aspect of the present invention, there is provided a method of synchronising data in a communications system comprising the steps of:
(a) generating at transmitting means a composite signal comprising a serial stream of data partitioned in one or more frames;
(b) transmitting the composite signal through communicating means to receiving means;
(c) generating multiphase clock signals;
(d) comparing the composite signal received at the receiving means with each of the multiphase clock signals until either sustained coincidence therebetween is achieved or sustained non-coincidence is achieved, thereby synchronising the receiving means to bit boundaries in the composite signal and to one or more of the clock phase signals; and
(e) correlating one or more bit templates at the receiving means with one or more corresponding bit templates in the composite signal received at the receiving means to determine where frames start in the composite signal, thereby synchronising the receiving means to the one or more frames in the composite signal.

The method potentially provides the advantages of:
an increase in separation distance between data transmitters and corresponding data receivers within the system;
an increase in serial data transmission rate in the system where its synchronisation architecture is fixed; and
a reduction in data clock rate for a given serial data rate; such a reduction in clock rate provides a benefit of reducing electromagnetic radiation within the system arising from data clock signals propagating around the system.

Further the invention provides the advantage that the receiving means is capable of synchronising itself to the composite signal even though the composite signal has suffered bit slip whilst propagating through the communicating means.

A conventional prior art communication system typically includes a master system clock for generating a master system clock signal for synchronising various parts of the system together. Whereas the master clock signal is sufficiently fast for data exchange at a bit rate similar to a clocking rate of the master signal, a problem arises in a situation when data exchange occurs locally in parts of the system at a rate faster than the clocking rate. The inventors have appreciated in this situation that it is beneficial to generate at the receiving means the multiphase clock signals from a master system clock signal supplied to the receiving means, the master clock signal being supplied by the system of the invention to both the transmitting means and the receiving means.

Where data exchange is to occur within the system of the invention at bit rates faster than the master clock rate, it is advantageous that the multiphase clock signals have a pulse duration which is not greater than half a data cycle period of the master clock. For certain specific rates of data exchange from the transmitting means to the receiving means, it is preferable that there are at least three clock phase signals generated.

Typically the clock phase signals are generated by logic circuits within the communication system. On account of binary counters being relatively easy to implement in such logic circuits, it is advantageous that there are $2^n$ clock phases, n being an integer having a value of 1 or greater.

The inventors have appreciated that synchronisation to bit boundaries in the composite signal is preferably achieved using a logic circuit at the receiving means operable to exclusively-OR the composite signal with a delayed version of the composite signal to generate a corresponding guard signal, and then compare the guard signal with each of the clock phase signals in a cyclical manner until either sustained coincidence or sustained non-coincidence of one or more of the clock phase signals with the guard signal is achieved, such sustained coincidence or non-coincidence being indicative of bit boundary synchronisation in the aforementioned step (d) to one or more of the clock phase signals providing the sustained coincidence or sustained non-coincidence.

Advantageously, the transmitting means is operable to include one or more frame words in the composite signal corresponding to the occurrence of frames within the composite signal, and the bit template used in the receiving means is arranged to be capable of correlating with the frame words. Such correlation is beneficially used for achieving frame synchronisation. Preferably, the frame word comprises two or more bits. More particularly, the frame word preferably comprises eight bits; when eight bits are used, ambiguity is best circumvented when the frame word has a binary value 00111100.

The method of the invention is especially useful when the stream of data comprises time division multiplexed (TDM) digital data. Such data is often generated in multichannel communication systems.

According to a second aspect of the present invention, there is provided a system for conveying data operable to synchronise to the data according to the first aspect of the present invention.

BRIEF DESCRIPTION OF THE DRAWINGS

Embodiments of the invention will now be described, by way of example only, with reference to the following diagrams in which.

DETAILED DESCRIPTION OF THE PREFERRED EMBODIMENTS

Figure 1:
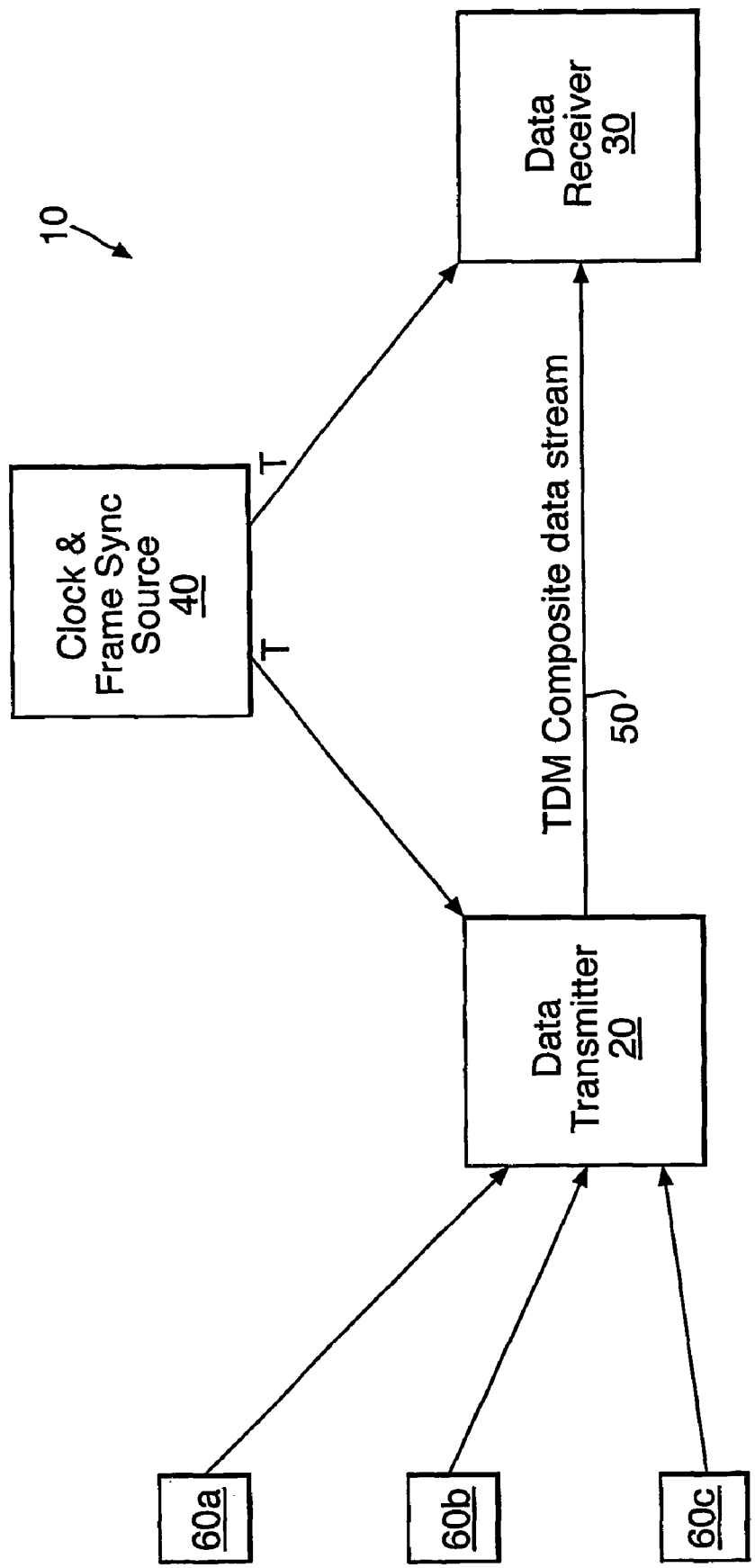
FIG. 1 is an illustration of a communication system known in the prior art, the system comprising a data transmitter, a data receiver and a data clock source.

Referring to FIG. 1, there is shown a prior art communication system indicated by 10. The system 10 can, for example, be an optical communication system comprising a plurality of system nodes interconnected through optical waveguides for conveying data bearing optical radiation between the nodes. Alternatively, the system 10 can be an electrical communication system comprising a plurality of nodes interconnected through electrical wires for conveying electrical bearing signals between the nodes, the electrical wires being, for example, one or more of twisted pairs and coaxial cable.

The system 10 comprises a data transmitter 20, a data receiver 30 and a data clock source 40. The transmitter 20 is coupled to the receiver 30 through a data link 50. Moreover, a clock output T and an associated frame synchronisation output of the source 40 are connected to both the transmitter 20 and the receiver 30. Data input devices 60a, 60b, 60c are connected to data inputs of the transmitter 20.

In operation, the source 40 at its output T outputs a data clock signal and a frame synchronisation signal which propagate to the transmitter 20 and to the receiver 30. The data devices 60a, 60b, 60c supply data to data inputs of the transmitter 20. The transmitter 20 assembles data received at its inputs into a time division multiplexed (TDM) composite data signal comprising data frames, each device having associated therewith a corresponding time slot in the frames in which its data is conveyed. Next, the transmitter 20 outputs the composite data signal through the data link 50 to the receiver 30 whereat it is received. The receiver 30 firstly uses the clock signal to synchronise to bit boundaries in the composite data signal, and then secondly finds features indicative of the start of each frame in the composite signal, thereby synchronising the receiver 30 to the frames and the synchronisation signal. The receiver 30 then proceeds to extract the data included in the time slots of the frames for output from the receiver 30 to other units (not shown).

Attempting to transfer data more rapidly in the composite data signal than the data clock signal rate can result in errors arising at the receiver 30 when extracting data from the frames as a result of signal propagation delays. At worst, synchronisation of the receiver 30 to frames in the composite data signal can be lost in such circumstances.

The method of synchronisation devised by the inventors applied to the prior art system 10 allows data to be conveyed in the composite data signal without changing clocking architecture employed in the system 10; however, applying the method to the system 10 requires some changes to its hardware. Such an avoidance of need to change the clocking architecture makes the invention especially suitable for existing communication systems which are to be upgraded to operate at higher data transfer rates. The devised method of synchronisation involves two stages:

STAGE 1: this is concerned with synchronising to bit boundaries within the composite data signal; and STAGE 2: this is concerned with ensuring that no bit slip occurs when aligning to frames at the receiver 30 with respect to the data clock signal.

The method will now be described with reference to FIGS. 2, 3 and 4.

Figure 2:
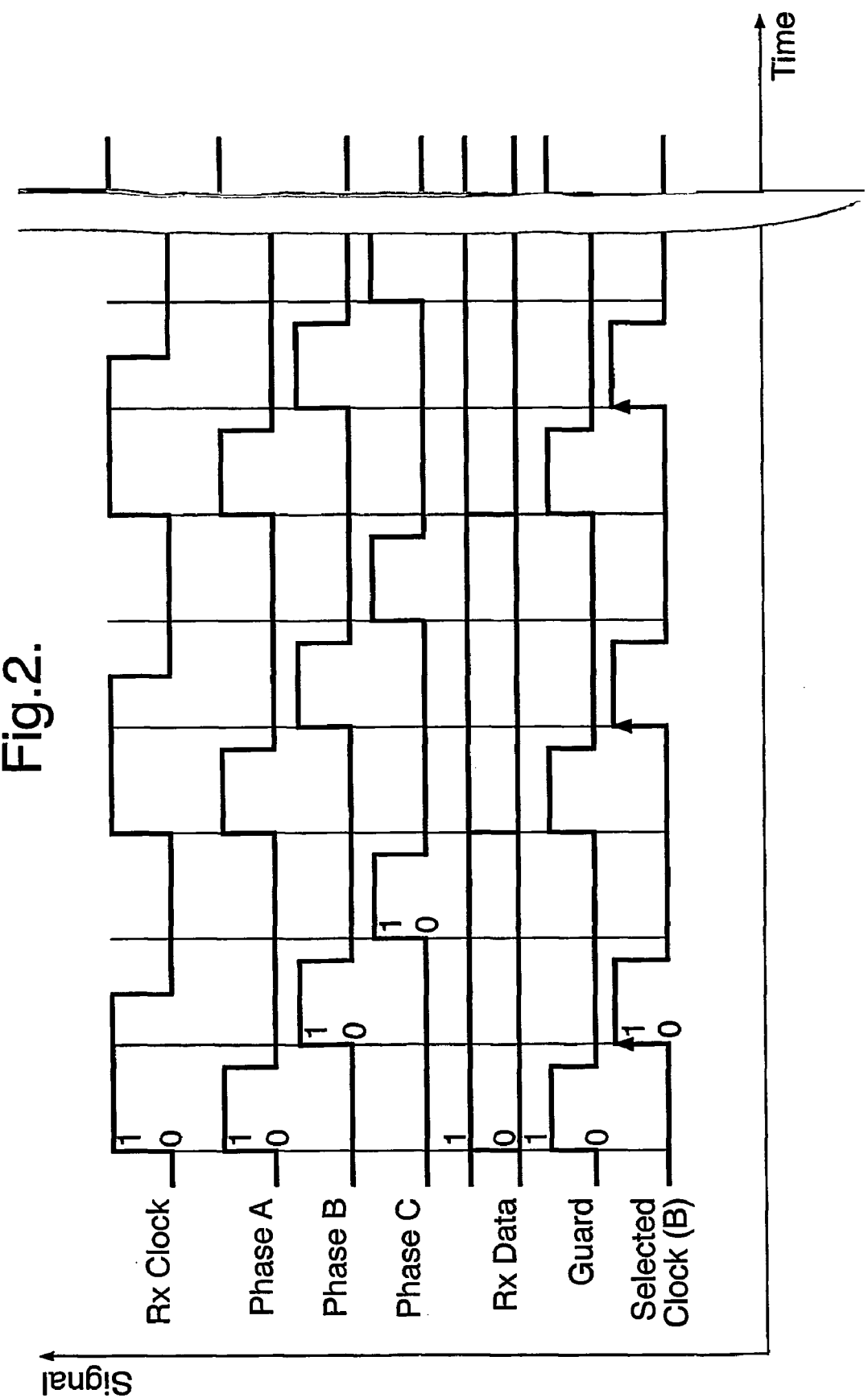
FIGS. 2, 3 and 4 are timing diagram illustrating clock data signals, a composite data signal and data signals derived from the clock signals and the composite signal.
Figure 3:
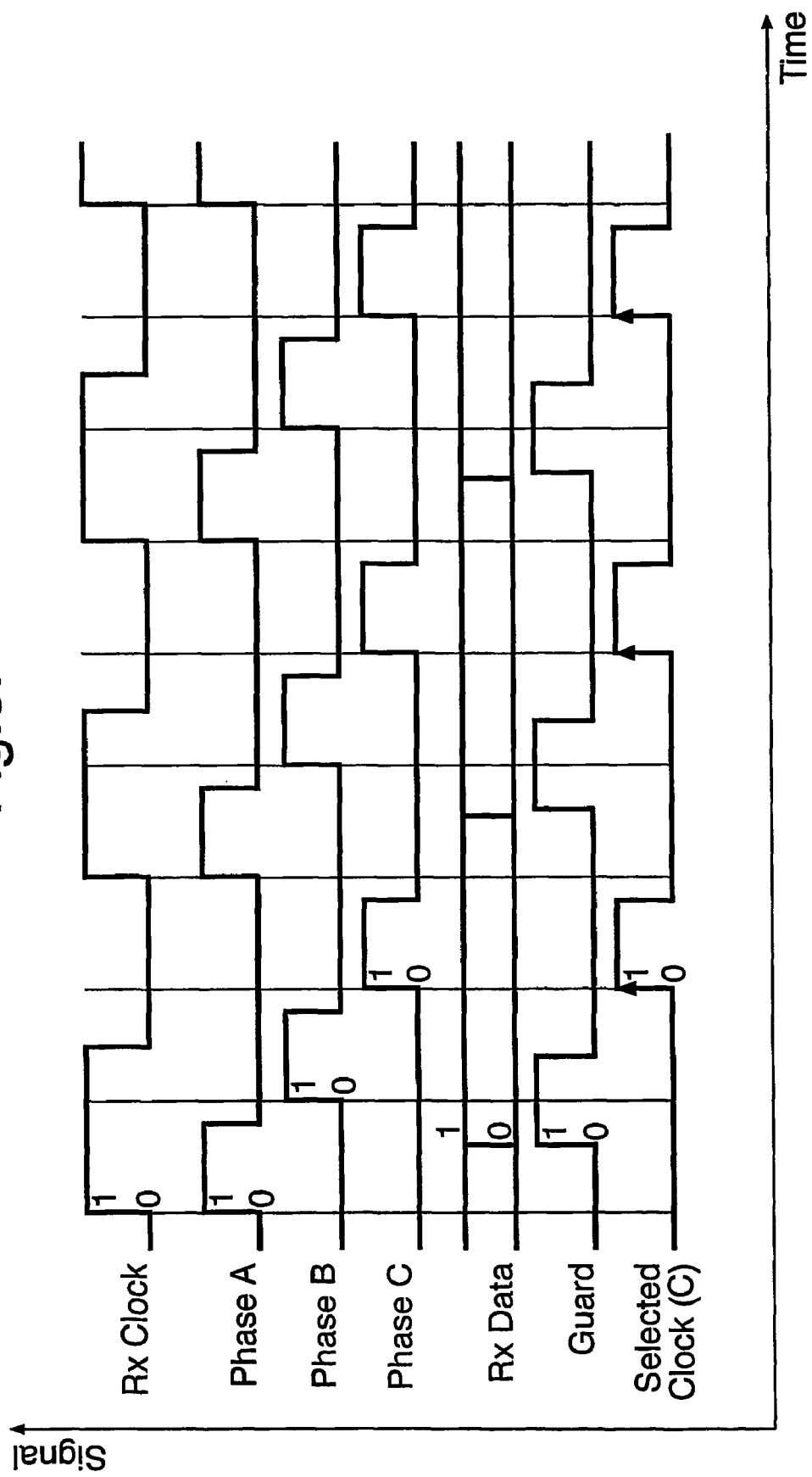
Figure 4:
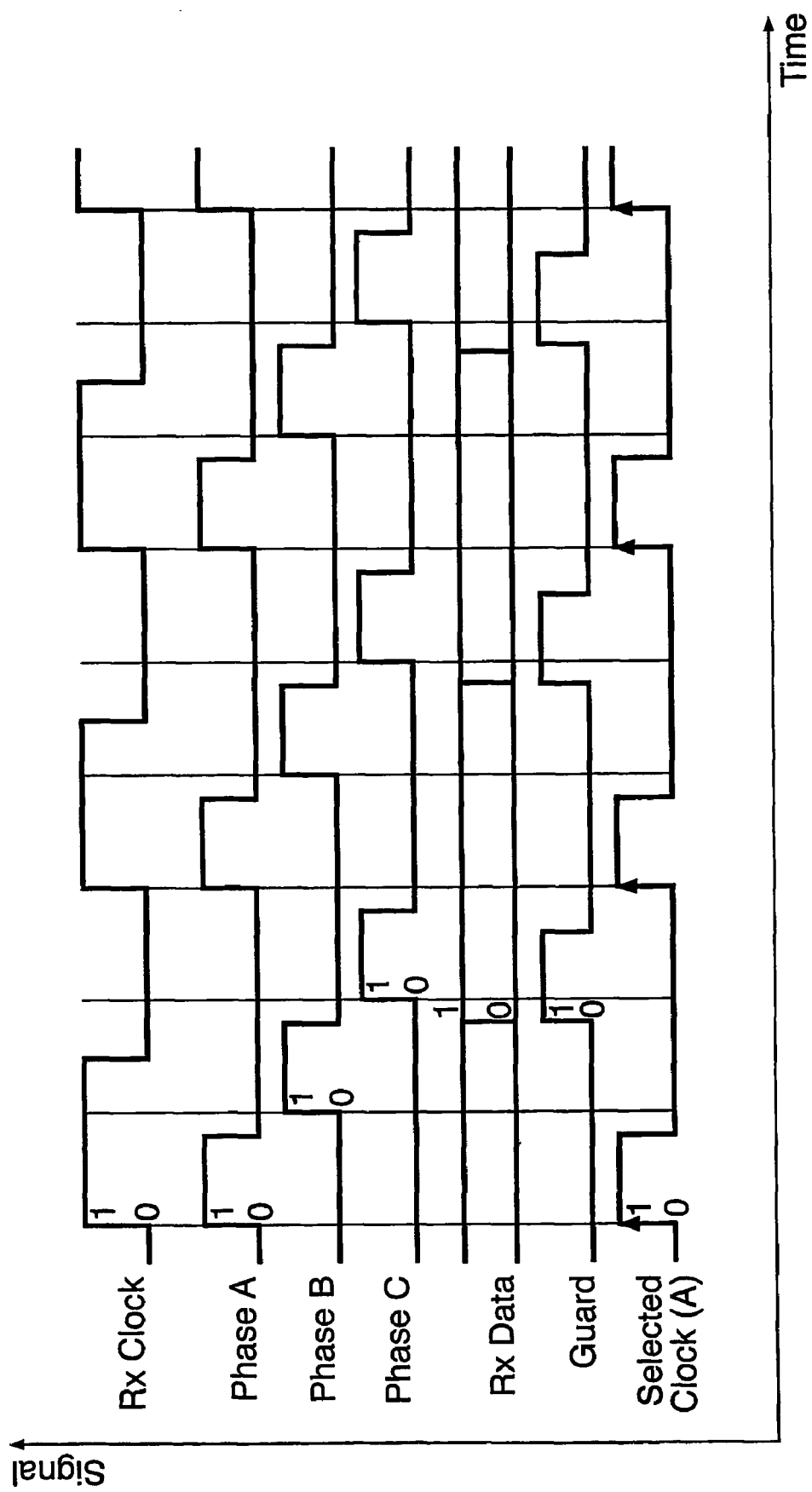

FIGS. 2, 3 and 4 include representations of a receive data clock signal, three-phase clock signals, the composite data signal as received at the receiver 30, a guard signal and a selected clock signal. The receive clock signal is denoted by "Rx Clock" and corresponds to the data clock signal from the clock source 40 as received at the receiver 30. Likewise, the three-phase clock signals are denoted by "Phase A", "Phase B" and "phase C". Additionally, the composite data signal is denoted by "Rx data". Moreover, the guard signal is denoted by "Guard". Furthermore, the selected clock signal is denoted by "Selected Clock (B)" in FIG. 2, by "Selected Clock (C)" in FIG. 3, and by "Selected Clock (A)" in FIG. 4. The FIGS. 2, 3 and 4 relate to mutually different phase relationships of the composite data signal to the three-phase clock signals and to the receive clock signal.

In FIGS. 2, 3 and 4, rising edges of the three-phase clock signals are active edges. The three-phase clock signals are phase locked to the data clock signal. They are preferably generated locally in the receiver 30 and have a mutually constant phase relationship as illustrated. Attentively, the three-phase clock signals can be generated at the clock source 40 and conveyed to the receiver 30 whilst maintaining their relative phase relationship. Moreover, although three clock phases are shown, there can be used two or more phases if necessary in the system 10. Furthermore, if $2^n$ phases are employed at the receiver 30, these $2^n$ phases can be derived relatively easily from a higher order system clock from which the data clock signal and the $2^n$ phases are all generated, for example by using logic counters. In the following description, three-phase clock signals will be assumed as shown.

The guard signal "Guard" is generated by exclusively ORing the composite data signal as received at the receiver 30 with a delayed version of itself. The delayed version is preferably delayed by a period not exceeding the pulse duration of logic 1 pulses of each of the clock phases, namely Phase A, phase B, Phase C.

In operation, the receiver 30 receives the data clock signal from the clock source 40. As a result of the receiver 30 being spatially separate relative to the transmitter 20, the data clock signal as received at the transmitter 20 is phase shifted relative to the data clock signal as received at the receiver 30. Even though the transmitter 20 is operable to output the composite data signal phase aligned to the data clock signal as received at the transmitter 20, the composite signal will not necessarily be phase aligned when received at the receiver 30 relative to the data clock signal as received at the receiver 30. Moreover, if the link 50 exhibits a time-variant path length for signals propagating therealong, for example as various changes and upgrades are made to the system 10 from time to time or its temperature varies, the phase alignment will be subject to temporal variations. Such a lack of phase alignment is addressed by the invention.

In a first mode of operation of the aforementioned STAGE 1, the receiver 30 searches for an appropriate clocking point in the composite data signal received at the receiver 30. In order to determine such an appropriate point, the receiver 30 commences by selecting one of the three clock phase signals, for example Phase A as a current clock signal as illustrated in FIG. 4, and then makes a comparison of the guard signal "Guard" with the active leading edge of the current clock signal by ANDing them together; if the guard signal is coincidentally logic 1 when the current clock signal switches from logic 0 to logic 1 at its active leading edge, synchronisation is deemed to have occurred. The receiver 30 then proceeds to check for a test time period that such coincidence is reliably maintained from cycle to cycle. If the coincidence is not sustained over the period or no coincidence is identified, the receiver 30 switches to using another of the clock phase signals, for example Phase B as the current clock signal. The receiver 30 then proceeds to determine whether or not there is sustained coincidence using clock phase Phase B. Again, if no coincidence is identified for Phase B, the receiver 30 next proceeds to switch to using another of the clock phase signals, for example Phase C, and then monitors to identify whether or not sustained coincidence occurs between Phase C and the guard signal.

In an alternative second mode of operation in the aforementioned STAGE 1, the receiver 30 searches for an appropriate clocking point in the composite data signal received at the receiver 30. In order to determine such an appropriate point, the receiver 30 commences by selecting one of the three clock phase signals, for example Phase A as a current clock signal as illustrated in FIG. 4, and then makes a comparison of the guard signal "Guard" with the active leading edge of the current clock signal by ANDing them together; if the guard signal is not coincidentally logic 1 when the current clock switches from logic 0 to logic 1 at its active leading edge, synchronisation is deemed to have occurred. The receiver 30 then proceeds to check for a test time period that such non-coincidence is reliably maintained from cycle to cycle. If the non-coincidence is not sustained over the period or coincidence is identified, the receiver 30 switches to using another of the clock phase signals, for example Phase B as the current clock signal. The receiver 30 then proceeds to determine whether or not there is sustained non-coincidence using clock phase Phase B. Again, if coincidence is identified for Phase B, the receiver 30 next proceeds to switch to using another of the clock phase signals, for example Phase C, and then monitors to identify whether or not sustained non-coincidence occurs between Phase C and the guard signal.

The receiver 30 is operable to cycle repetitively through the clock phase signals until either sustained coincidence or sustained non-coincidence depending upon the mode of operation of a selected current clock phase signal relative to the guard signal is achieved over the test time period. When sustained coincidence or non-coincidence is achieved, the current clock phase selected becomes a "safe clock" for the receiver 30 to use. When the safe clock is identified, synchronisation to bit boundaries is deemed to have occurred.

Figure 5:
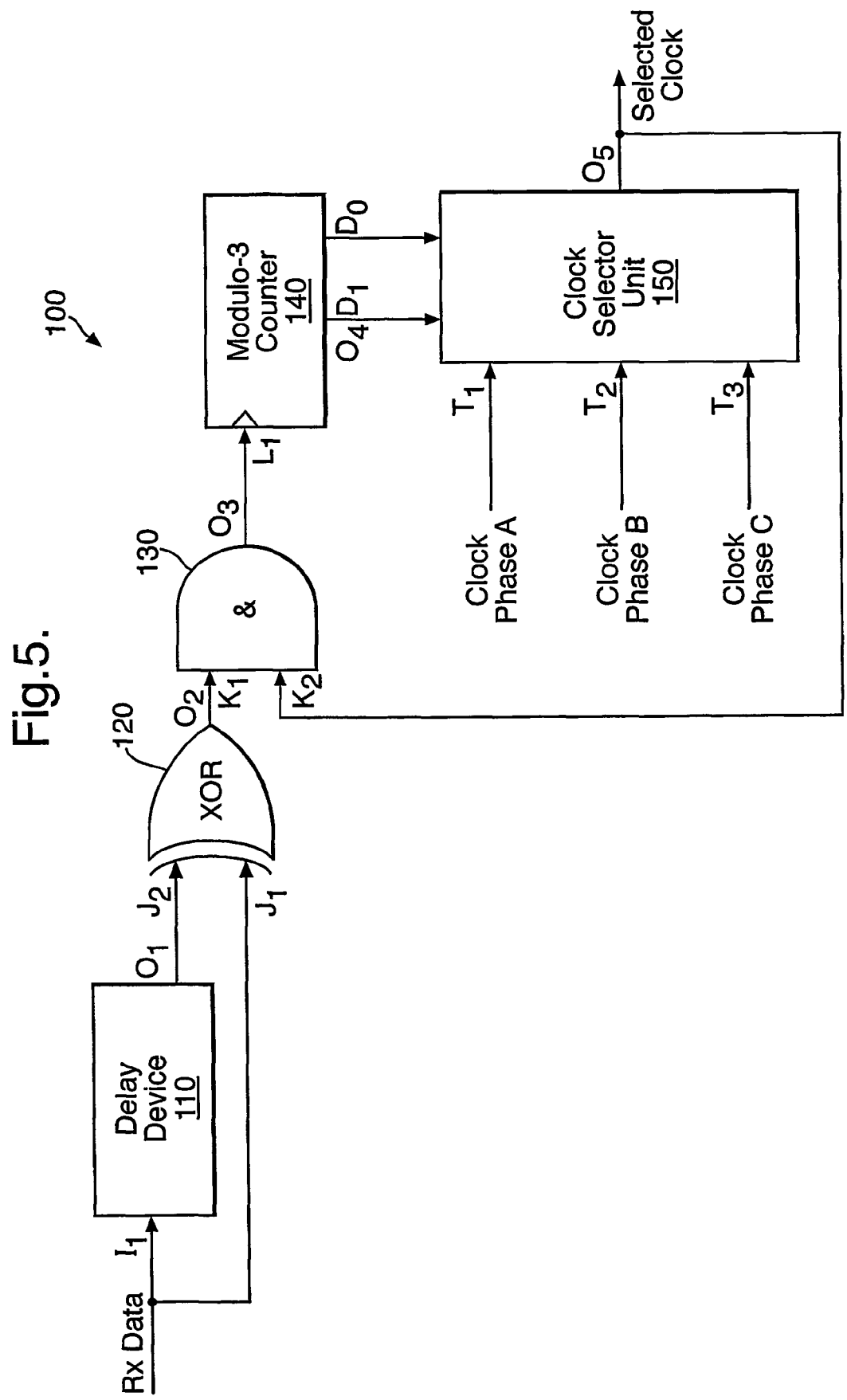
FIG. 5 is an illustration of a clock selection logic unit for inclusion in the data receiver of the prior art communication system shown in FIG. 1 to implement fractional bit delay synchronisation according to the invention.

Selection of the clock phase signals for determining the "safe clock" can be achieved by incorporating hardware as shown in FIG. 5 into the system 10. FIG. 5 is a depiction of a clock selection logic unit indicated generally by 100. The unit 100 comprises a delay device 110, an exclusive-OR gate 120, an AND gate 130, a modulo-3 counter 140 and a clock selector unit 150. The input "Rx data" is connected to a logic input $I_1$ of the delay device 110 and also to a first logic input $J_1$ of the exclusive-OR gate 120. A logic output $O_1$ of the delay device 110 is coupled to a second logic input $J_2$ of the exclusive-OR gate 120. A logic output $O_2$ from the exclusive-OR gate 120 is connected to a first logic input $K_1$ of the AND gate 130. A second logic input $K_2$ of the AND gate 130 is connected to a logic output $O_5$ of the clock selector 150. An output $O_3$ from the AND gate 130 is coupled to a logic input $L_1$ of the counter 140. Counter outputs $O_4$ comprising data lines $D_0$ and $D_1$ are coupled to counter logic inputs of the selector 150. Finally, the three clock phase signals Phase A, Phase B, Phase C are connected to corresponding logic clock inputs $T_1$, $T_2$, $T_3$ respectively of the clock selector 150.

In operation, the clock selection unit 100 receives the composite data signal "Rx data" as received at the receiver 30 and sequentially steps through the clock phase signals supplied to the clock selector 150 until sustained coincidence of the guard signal relative to the current selected clock phase signal is achieved; the counter 140 is responsible for cyclically stepping the selector 150 through the clock phase signals until sustained coincidence or non-coincidence is achieved depending upon the mode of operation. The guard signal in FIG. 5 corresponds to the output $O_2$ of the exclusive-OR gate 120. Moreover, selection of the current clock phase signal occurs within the clock selector 150. The counter 140 is operable to cyclically switch through the clock phase signals until synchronisation is achieved, namely until the safe clock is identified The safe clock is finally output at the output $O_5$ of the clock selector 150.

Figure 6:
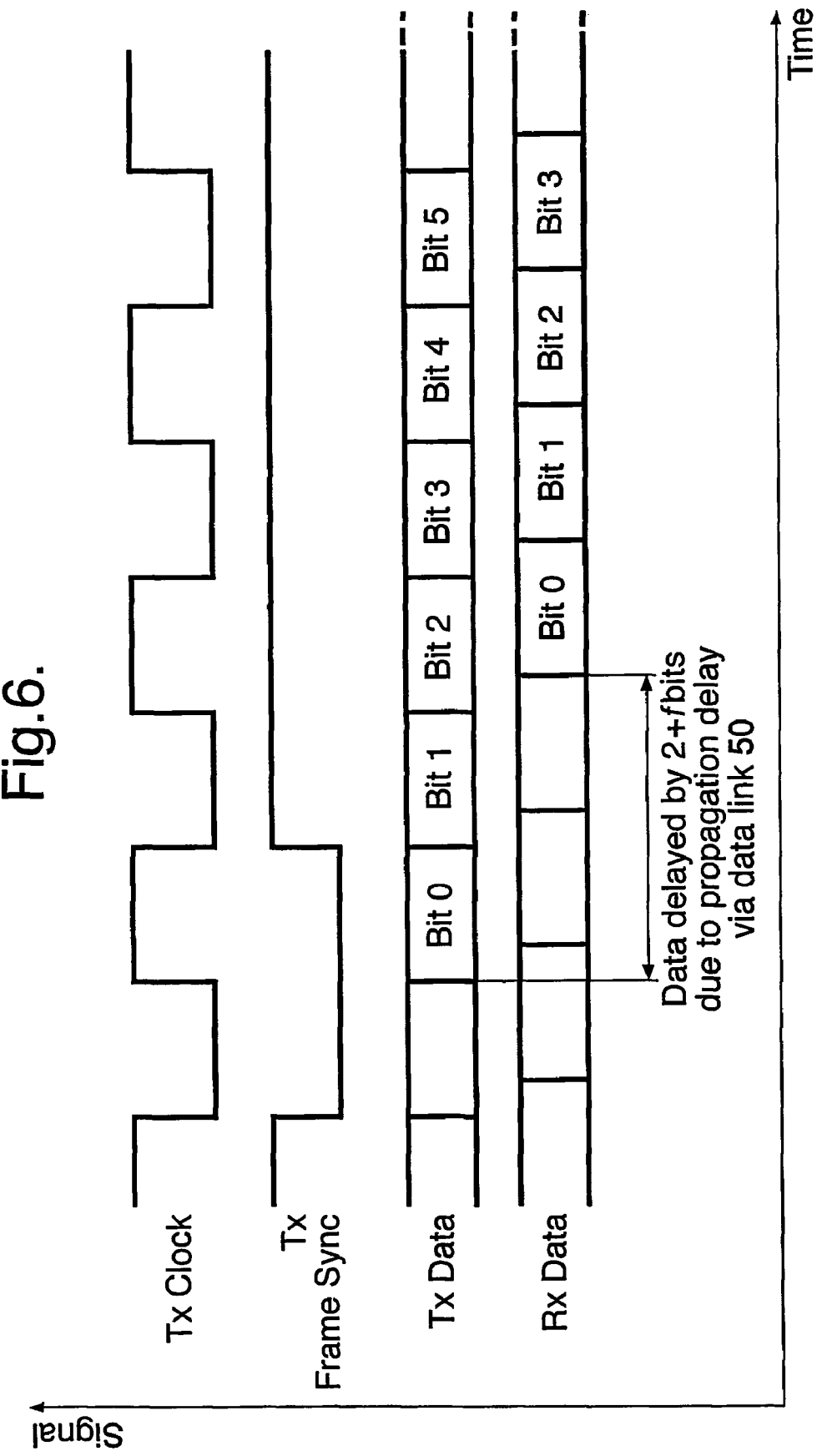
FIG. 6 is an illustration of integer and fractional bit delay occurring in the composite data signal received in the system in FIG. 1 modified according to the invention.

FIG. 6 is an illustration of a transmitted data signal "Tx data" at twice the rate of the data clock signal "Tx clock" received at the transmitter 20. There is also shown a fractional bit delay occurring in the composite data signal "Rx data" received at the receiver 30 in the system 10 modified to implement the present invention. Likewise, there is shown a frame synchronisation signal "Frame sync" as received at the transmitter 20, the "Frame sync" signal being employed in the transmitter 20 to determine the start of frames in the composite data stream. The composite data signal "Tx data" output from the transmitter 20 is shown temporally aligned to the "Frame sync" signal and a rising edge of the "Tx clock" signal, the "Tx data" being represented by Bit 0 to Bit 5 in FIG. 6, although the "Tx data" comprises in total more bits after these 6 initial bits shown.

Problems of fractional bit delay are addressed in STAGE 1 by employing the three phase clock signals as described in the foregoing. STAGE 1 is effective at ensuring that bit boundaries in the composite data signal are temporally aligned to one of the clock phase signals at the receiver 30, namely for coping with fractional bit delays. A further problem that can arise in the system 10 is that the data link 50 results in a data propagation delay from the transmitter 20 to the receiver 30 which is more than 1 bit, for example 2.33 bits duration as illustrated in FIG. 6 where STAGE 1 addresses the fractional delay of 0.33 bits, namely bit fraction "f". STAGE 2 is arranged to address discrete n-bit delays and is necessary for ensuring frame synchronisation is achieved; for example, there is a 2-bit delay illustrated in FIG. 6.

The "Frame sync" signal is generated at the source 40 and is supplied together with the data clock signal to both the transmitter 20 and the receiver 30. The "Frame sync" signal is normally at a logic state 1 except at the beginning of each frame in the composite data stream when it has a frame pulse of logic state 0 corresponding to bit 0 of the bit frame in the composite data signal. Bit 0 is launched at the transmitter 20 substantially at a time in the centre of the frame pulse although timing skew within the system 10 can cause the time to deviate in some circumstances.

The minimum and maximum data propagation delays for the system 10 will be known in advance, for example by experimental measurement on the system 10 or, alternatively, by computer simulation of the system 10. However, the propagation delay for the composite data signal to pass through the data link 50 will lie within these minimum and maximum delays, although its precise value will not be known initially when implementing STAGE 1.

Thus, STAGE 2 involves the transmitter 20 injecting a frame word into the composite data signal, the word having a beginning data bit preferably coincident at the transmitter 20 with the centre of the frame synchronisation pulse received at the transmitter 20 from the source 40. The frame word is preferably injected by the transmitter 20 no earlier than the frame synchronisation pulse output from the source 40 and as received at the data receiver 30.

The receiver 30 is operable, once bit synchronisation has been achieved in STAGE 1, to correlate a template of the frame word with the composite data signal received at the receiver 30, shifting the template relative to the received composite data signal or vice versa within the minimum and maximum limits for expected delay relative to an active clock edge nominally coincident with the centre of the frame pulse. When correlation is achieved, the bit slip applied to the template relative to the composite data signal corresponds to the whole number of integer bit delays arising from propagation of the composite data signal through the data link 50 subject to any timing skews arising from the clock data signal propagating from the source 40 to the transmitter 20 and the receiver 30.

Figure 7:
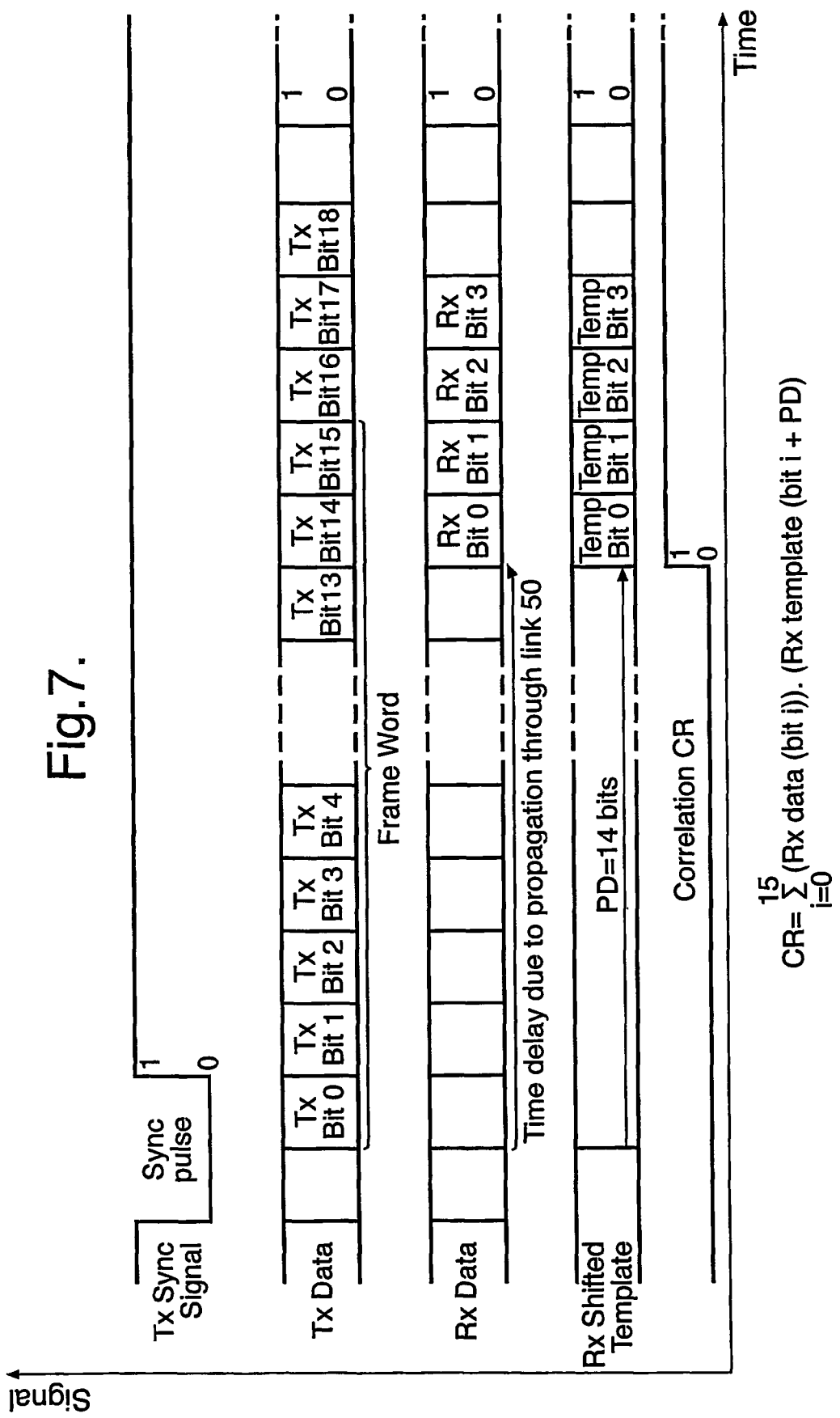
FIG. 7 is an illustration of correlation of a received composite data signal at the data receiver with a frame word for determining integer bit slip at the data receiver.

Correlation of the received composite data signal, represented by Rx bit 0 to Rx bit 15, with the template, represented by Temp bit 0 to Temp bit 15, is illustrated in FIG. 7. A propagation delay shift PD is varied in integer steps with respect to the safe clock identified in STAGE 1 between the minimum and maximum expected propagation delays; when correlation is achieved, the receiver has determined the amount of bit slip. In FIG. 7, the bit slip amounts to 14 bits to achieve correlation, correlation being defined by Equation 1 (Eq. 1) where best correlation corresponds to a maximum value of CF as PD is varied:

$$CR = \sum_{i=0}^{15} (Rx\_data(bit\_i)).(Rx\_template(bit\_i + PD)) \qquad \text{Eq. 1}$$

The frame word can be selected to comprise two or more bits, for example 8 bits or, alternatively, 16 bits as illustrated in FIG. 7. When the frame word comprises a byte of 8 bits length, the word preferably has a binary value 00111100; choice of this value of frame word assists to circumvent aliasing with payload data included after the frame word in the composite data signal.

Figure 8:
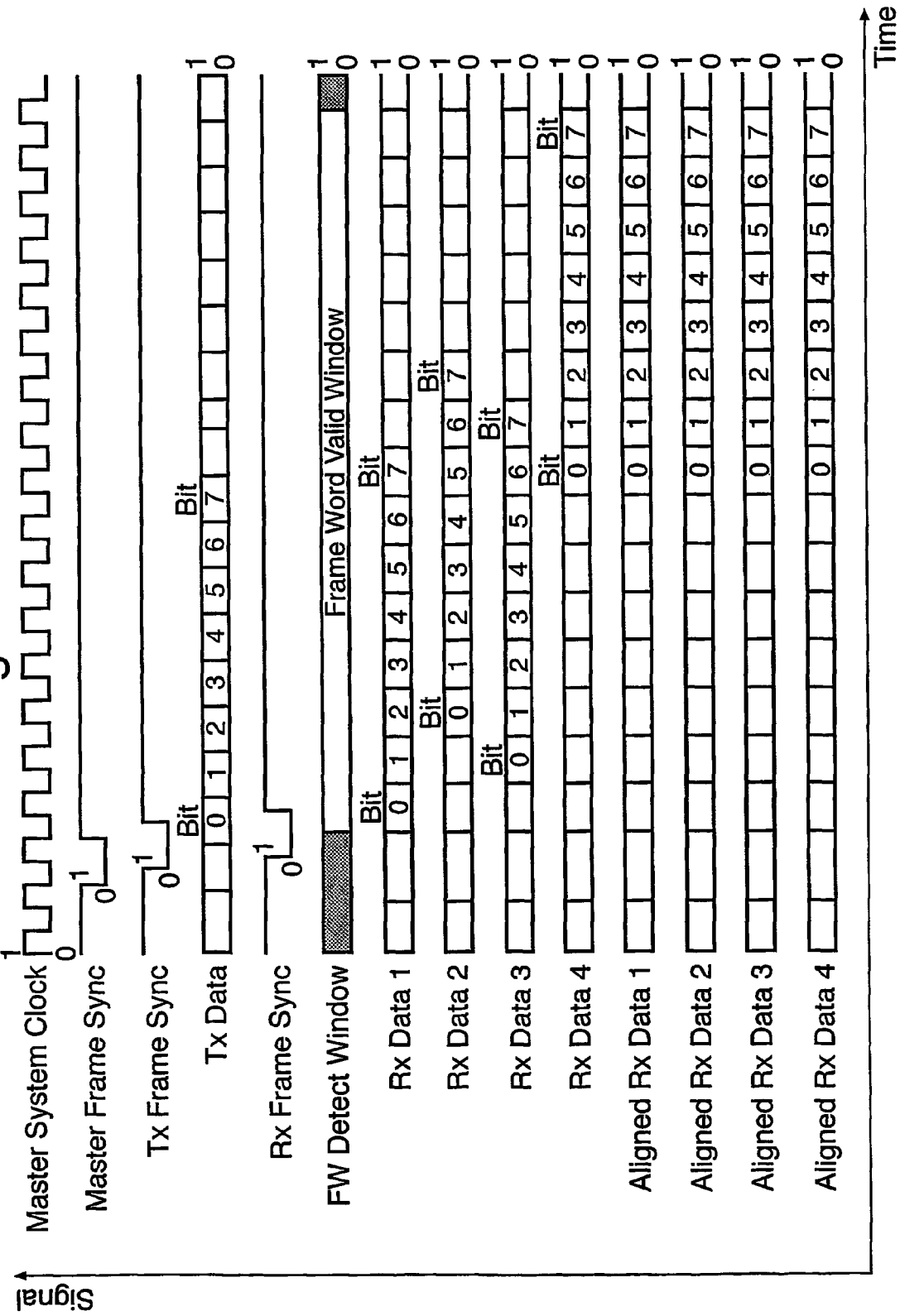
FIG. 8 is a timing diagram illustrating transmitted and received composite data signals, together with frame synchronisation signals and aligned data.

An alignment timing table Table 1 below in combination with FIG. 8 illustrates an example of relative timing of the composite data signal as output at the transmitter 20 relative to the composite data signal as received at the receiver 30. As described in the foregoing, once minimum and maximum propagation delays within the system 10 are known, for example by measurement or simulation, it is possible to guarantee at the receiver 30 a time window, namely "Frame word valid window" in FIG. 8, in which the start of frames in the composite data signal received at the receiver 30 will fall relative to the frame synchronisation pulse received at the receiver 30. "Rx Data 1" in FIG. 8 illustrates an earliest point in time that the start of frames within the composite data will be received and correctly recognised at the receiver 30. Likewise, "Rx Data 4" illustrates a latest point in time for the start of frames at the receiver 30 to be received and recognised. Moreover, "Rx Data 2" and "Rx Data 3" depict two possible intermediate delays which the receiver 30 is capable of accommodating for synchronisation purposes. When the composite data signal comprises a plurality of parallel data streams, for example a parallel combination of data streams "Rx Data 1" to "Rx Data 4", each parallel data stream needs to have a corresponding alignment circuit operable according to the invention provided in the receiver 30.

Figure 9:
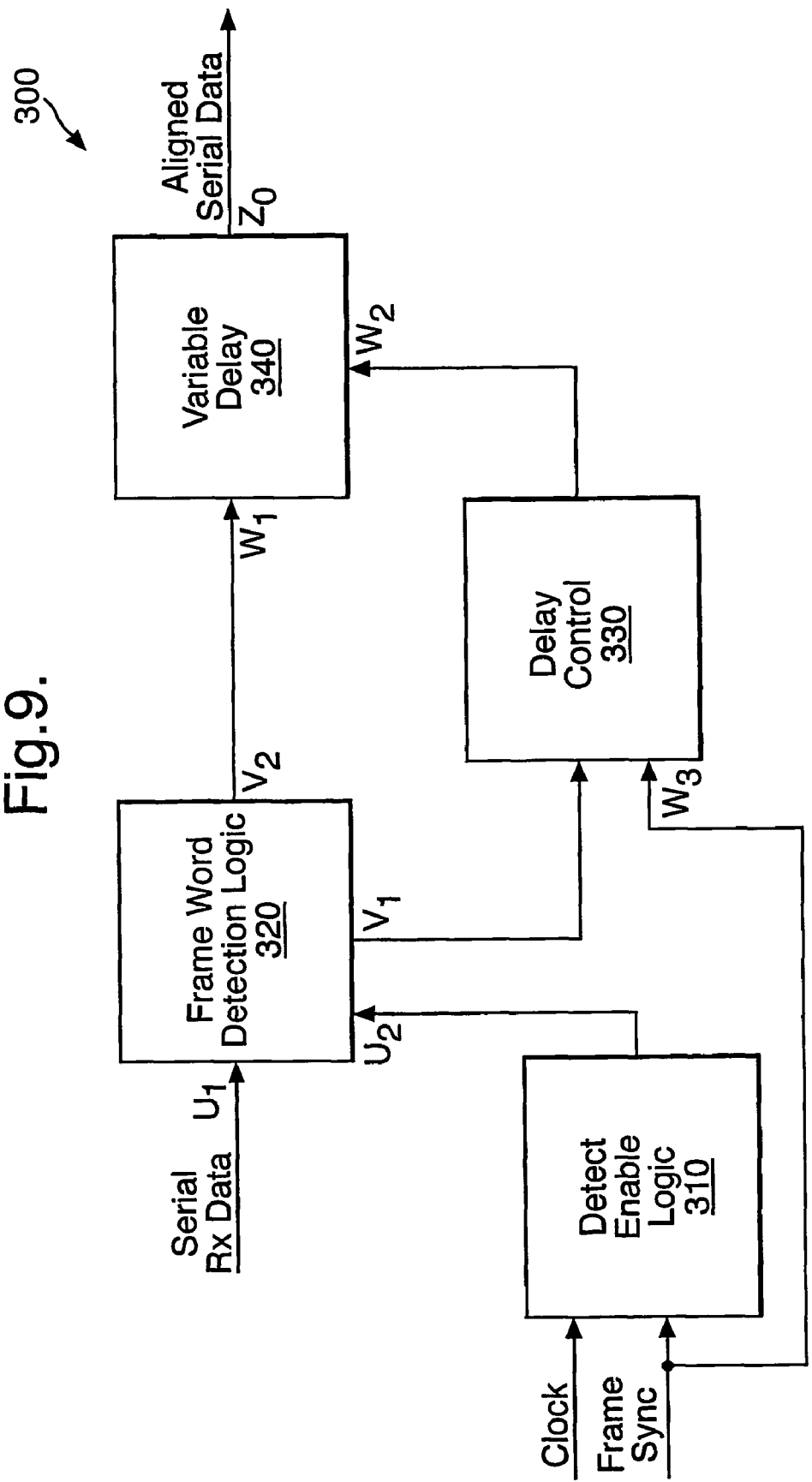
FIG. 9 is an illustration of hardware logic incorporated into the data receiver of the system shown in FIG. 1 to implement frame synchronisation according to the invention.

The receiver 30 incorporates additional hardware to implement STAGE 2 as illustrated in FIG. 9. The hardware is indicated generally by 300 and comprises a detect enable logic unit 310, a frame word detection logic unit 320, a delay control logic unit 330 and a variable delay unit 340. The detection logic unit 320 comprises a first input $U_1$ for receiving the composite data signal from the transmitter 20, a second input $U_2$ for receiving an output signal from the detect enable logic unit 310, a first output $V_1$ connected to an input of the delay control unit 330 and a second output $V_2$ connected to a first input $W_1$ of the variable delay unit 340. The detect enable unit 310 includes two inputs, namely a first input for receiving the data clock signal from the source 40 and a second input for receiving the frame synchronisation signal from the source 40. The delay control unit 330 comprises an output which is coupled to a second input $W_2$ of the variable delay unit 340. The delay control unit 330 also includes an input $W_3$ for receiving the frame synchronisation signal. Additionally, the variable delay unit 340 comprises an output $Z_0$ at which a frame-aligned composite data signal is output.

In operation, the detect enable unit receives the data clock and the frame synchronisation data and generates the "Frame Word Valid Window" shown in FIG. 8. The frame word detection unit 320 uses the frame synchronisation data together with the frame word provided thereto in various relative shifted states for correlating with the composite data stream; the detection unit 320 thereby determines when correlation has occurred in the composite stream received at the receiver 30. The output $V_1$ conveys a output signal from the frame word detection unit 320 to the delay control unit 330 indicative of achieved correlation. The delay control unit 330 determines the amount of bit slip and hence the number of padding bits to be added in the variable delay unit 340. The number of padding bits required is communicated to the variable delay unit 340 which adds these bits as appropriate to the composite data stream to provide the frame aligned composite data signal at the output $Z_0$.

It will be appreciated by those skilled in the art that modifications can be made to the system 10 adapted to implement the invention without departing from the scope of the invention. As mentioned in the foregoing, the invention is especially useful in an existing communication system which has an established clock timing hierarchy; the invention enables a data flow rate at greater than determined by existing system clocks to be achieved within the system, for example where system upgrades are being installed to improve, for example, communication bandwidth. The invention is applicable, for example, to high speed computer networks when implementing upgrades therein which involve adding parts capable of supporting data transfer rates in excess of present clocking rates within the networks. Moreover, the invention is also applicable to within computer systems; for example, the invention can be applied within PCs where high serial data flow rates of several Gbits/second are required, the systems having internal clocks presently set at a relatively lower clocking rate in the order of 1 GHz.

TABLE 1

| Actual data link 50 delay | Padding delay added by variable delay unit 340 | Total delay (at $Z_0$ output) | Padding delay applies to data stream: |
|---|---|---|---|
| 0 bits | 7 bits | 7 bits | Rx Data 1 |
| 1 bit | 6 bits | 7 bits | Rx Data 2 |
| 2 bits | 5 bits | 7 bits | Rx Data 3 |
| 3 bits | 4 bits | 7 bits | |
| 4 bits | 3 bits | 7 bits | |
| 5 bits | 2 bits | 7 bits | |
| 6 bits | 1 bit | 7 bits | |
| 7 bits | 0 bits | 7 bits | Rx Data 4 |

The invention claimed is:

1. A method of synchronizing data in a communications system, comprising the steps of:
   (a) generating at transmitting means a composite signal comprising a serial stream of data partitioned in at least one frame;
   (b) transmitting the composite signal through communicating means to receiving means;
   (c) generating multiphase clock signals at the receiving means from a master system clock data signal supplied by the system to both the transmitting means and the receiving means;
   (d) comparing the composite signal received at the receiving means with each of the multiphase clock signals until at least one of sustained coincidence therebetween is achieved and sustained non-coincidence is achieved, thereby synchronizing the receiving means to bit boundaries in the composite signal and to at least one of the clock signals;
   (e) correlating at least one bit template at the receiving means with at least one corresponding bit template in the composite signal received at the receiving means to determine where said at least one frame starts in the composite signal, thereby synchronizing the receiving means to said at least one frame in the composite signal; and
   (f) generating a corresponding guard signal by exclusively-ORing the composite signal with a delayed version of itself, and comparing the corresponding guard signal with each of the clock signals in a cyclical manner until at least one of the sustained coincidence and the sustained non-coincidence of said at least one of the multiphase clock signals with the guard signal is achieved, the sustained coincidence or the non-coincidence being indicative of bit boundary synchronization in step (d).

2. The method according to claim 1, wherein the multiphase clock signals have a pulse duration which is not greater than half a cycle period of the master clock signal.

3. The method according to claim 1, wherein there are at least three multiphase clock signals generated in step (c).

4. The method according to claim 1, wherein there are $2^n$ clock phase signals generated in step (c), n being an integer having a value of 1 or greater.

5. The method according to claim 1, wherein the transmitting means is operable to include at least one frame word in the composite signal corresponding to the occurrence of said at least one frame within the composite signal, and said at least one bit template used in the receiving means is arranged to be capable of correlating with said at least one frame word.

6. The method according to claim 5, wherein said at least frame word comprises a plurality of bits.

7. The method according to claim 6, wherein said at least one frame word comprises eight bits.

8. The method according to claim 7, wherein each frame word has a binary value of 00111100.

9. The method according to claim 1, wherein the composite signal comprises time division multiplexed (TDM) digital data.

10. A communication system for synchronizing data, comprising:
   (a) transmitting means for generating a composite signal comprising a serial stream of data partitioned in at least one frame;
   (b) receiving means for receiving the composite signal through communicating means;
   (c) means for generating multiphase clock signals at the receiving means from a master system clock data signal supplied by the system to both the transmitting means and the receiving means;
   (d) means for comparing the composite signal received at the receiving means with each of the multiphase clock signals until at least one of sustained coincidence therebetween is achieved and sustained non-coincidence is achieved, thereby synchronizing the receiving means to bit boundaries in the composite signal and to at least one of the clock signals;
   (e) means for correlating at least one bit template at the receiving means with at least one corresponding bit template in the composite signal received at the receiving means to determine where said at least one frame starts in the composite signal, thereby synchronizing the receiving means to said at least one frame in the composite signal; and
   (f) means for generating a corresponding guard signal by exclusively-ORing the composite signal with a delayed version of itself, and for comparing the corresponding guard signal with each of the clock signals in a cyclical manner until at least one of the sustained coincidence and the sustained non-coincidence of said at least one of the multiphase clock signals with the guard signal is achieved, the sustained coincidence or the non-coincidence being indicative of bit boundary synchronization.

* * * * *